United States Patent
Saitoh et al.

(10) Patent No.: US 11,287,685 B2
(45) Date of Patent: Mar. 29, 2022

(54) OPTICAL ELEMENT AND IMAGE DISPLAY DEVICE

(71) Applicant: FUJIFILM Corporation, Tokyo (JP)

(72) Inventors: Yukito Saitoh, Minami-ashigara (JP); Hiroshi Sato, Minami-ashigara (JP); Katsumi Sasata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/226,193

(22) Filed: Apr. 9, 2021

(65) Prior Publication Data

US 2021/0302744 A1   Sep. 30, 2021

Related U.S. Application Data

(63) Continuation of application No. PCT/JP2019/039611, filed on Oct. 8, 2019.

(30) Foreign Application Priority Data

Oct. 12, 2018 (JP) .............................. JP2018-193246

(51) Int. Cl.
*G02F 1/1335* (2006.01)
*G02F 1/13363* (2006.01)

(52) U.S. Cl.
CPC .... *G02F 1/133524* (2013.01); *G02F 1/13363* (2013.01); *G02F 1/133541* (2021.01)

(58) Field of Classification Search
CPC ........... G02F 1/133524; G02F 1/13363; G02B 5/3083
See application file for complete search history.

(56) References Cited

U.S. PATENT DOCUMENTS

2016/0011353 A1* 1/2016 Escuti .................. G02B 5/3083
                                                                  359/15
2016/0033698 A1   2/2016 Escuti et al.
(Continued)

FOREIGN PATENT DOCUMENTS

JP       2017-522601 A    8/2017
WO    WO 2019/093228 A1   5/2019

OTHER PUBLICATIONS

International Preliminary Report on Patentability and Written Opinion of the International Searching Authority (Forms PCT/IB/326, PCT/IB/373 and PCT/ISA/237) for corresponding International Application No. PCT/JP2019/039611, dated Apr. 22, 2021, with English translation.

(Continued)

*Primary Examiner* — Jia X Pan
(74) *Attorney, Agent, or Firm* — Birch, Stewart, Kolasch & Birch, LLP

(57) ABSTRACT

An object of the present invention is to provide an optical element capable of widening a field of view of an AR glass or the like; and an image display device using the optical element. The object is accomplished with an optical element including a light guide plate; a switching $\lambda/2$ plate capable of switching a phase difference between zero and $\lambda/2$; and a first optically anisotropic layer that is arranged between the light guide plate and the switching $\lambda/2$ plate, is formed using a composition including a liquid crystal compound, and has a liquid crystal alignment pattern in which an orientation of an optical axis derived from the liquid crystal compound changes while continuously rotating along at least one in-plane direction of the first optically anisotropic layer.

15 Claims, 5 Drawing Sheets

(56) References Cited

U.S. PATENT DOCUMENTS

| | | | |
|---|---|---|---|
| 2016/0154247 A1* | 6/2016 | Liu | G02F 1/31 349/193 |
| 2019/0227375 A1* | 7/2019 | Oh | G02B 5/30 |
| 2020/0271839 A1 | 8/2020 | Saitoh et al. | |

OTHER PUBLICATIONS

International Search Report (Form PCT/ISA/210) for corresponding International Application No. PCT/JP2019/039611, dated Dec. 17, 2019, with English translation.
Kress et al., "Towards the Ultimate Mixed Reality Experience: HoloLens Display Architecture Choices." SID 2017 Digest, 2017, pp. 127-131.

* cited by examiner

OPTICAL ELEMENT AND IMAGE DISPLAY DEVICE

CROSS-REFERENCE TO RELATED APPLICATIONS

This application is a Continuation of PCT International Application No. PCT/JP2019/039611 filed on Oct. 8, 2019, which claims priority under 35 U.S.C. § 119(a) to Japanese Patent Application No. 2018-193246 filed on Oct. 12, 2018. Each of the above applications is hereby expressly incorporated by reference, in its entirety, into the present application.

BACKGROUND OF THE INVENTION

1. Field of the Invention

The present invention relates to an optical element that guides incidence light and an image display device using the optical element.

2. Description of the Related Art

In recent years, augmented reality (AR) glasses that display a virtual image, various types of information, or the like to be superimposed on a scene that is actually being seen, as described in Bernard C. Kress et al., Towards the Ultimate Mixed Reality Experience: HoloLens Display Architecture Choices, SID 2017 DIGEST, pp. 127-131, have been put into practice. The AR glasses are also called, for example, smart glasses, head mounted displays (HMD), AR eyeglasses, or the like.

As described in Bernard C. Kress et al., Towards the Ultimate Mixed Reality Experience: HoloLens Display Architecture Choices, SID 2017 DIGEST, pp. 127-131, AR glasses display a virtual image to be superimposed on a scene that is actually being seen by a user, for example, by allowing an image displayed by a display (optical engine) to be incident into one end of a light guide plate, propagate in the light guide plate, and be emitted from the other end of the light guide plate.

In AR glasses, an image (projection light) displayed on a display is diffracted (refracted) using a diffraction element and incident into one end part of a light guide plate. As a result, the light is introduced into the light guide plate at an angle, and fully reflected in the light guide plate, whereby the light is guided. The light guided in the light guide plate is also diffracted by the diffraction element in the other end part of the light guide plate and thus emitted from the light guide plate to an observation position by the user, whereby an image is displayed.

As an example of a diffraction element that is used for an AR glass in which light is incident into a light guide plate at an angle, the optical element (liquid crystal diffraction element) described in JP2017-522601A is exemplified.

This optical element comprises a plurality of laminated birefringence sublayers that change the propagation direction of light passing through the inside according to Bragg conditions, in which the laminated birefringence sublayers comprise local optical axes that change along each of interfaces between adjacent layers of the laminated birefringence sublayers so as to define each of grating cycles.

Specifically, the optical element described in JP2017-522601A has a plurality of optically anisotropic layers formed using a composition including a liquid crystal compound, and the optically anisotropic layer has a liquid crystal alignment pattern in which an orientation of an optical axis of the liquid crystal compound changes while continuously rotating along one in-plane direction of the optically anisotropic layer.

In a case where circularly polarized light is incident into such the optical element, the revolving direction of the circularly polarized light is reversed while the circularly polarized light is refracted toward the upstream or downstream side in one direction along which the optical axis of the liquid crystal compound rotates, depending on the revolving direction of the circularly polarized light and the one direction along which the optical axis of the liquid crystal compound rotates.

Accordingly, by using the optical element, the image on the display is diffracted and the light is introduced into the light guide plate at an angle, whereby the light can be guided in the light guide plate.

SUMMARY OF THE INVENTION

Meanwhile, AR glasses are required to have a wide field of view (FOV) which is a region that displays an image.

However, in a case where the optical element described in JP2017-522601A is used for an AR glass, a sufficient field of view may not be obtained in some cases.

An object of the present invention is to solve such the problem in the related art, and thus to provide an optical element that can make incidence light be incident into a light guide plate at a plurality of different angles, and is capable of display an image with a wide field of view, for example, at the time of being used for an AR glass; and an image display device using the optical element.

In order to accomplish the object, the optical element of an embodiment of the present invention has the following configurations.

[1] An optical element comprising:
a light guide plate;
a switching $\lambda/2$ plate capable of switching a phase difference between zero and $\lambda/2$; and
a first optically anisotropic layer that is arranged between the light guide plate and the switching $\lambda/2$ plate, is formed using a composition including a liquid crystal compound, and has a liquid crystal alignment pattern in which an orientation of an optical axis derived from the liquid crystal compound changes while continuously rotating along at least one in-plane direction of the first optically anisotropic layer.

[2] The optical element as described in [1],
in which in the liquid crystal alignment pattern of the first optically anisotropic layer, the orientation of the optical axis derived from the liquid crystal compound changes while continuously rotating along only one in-plane direction of the first optically anisotropic layer.

[3] The optical element as described in [1] or [2], further comprising a second optically anisotropic layer that is formed using a composition including a liquid crystal compound and has a liquid crystal alignment pattern in which an orientation of an optical axis derived from the liquid crystal compound changes while continuously rotating along at least one in-plane direction of the second optically anisotropic layer,
in which the switching $\lambda/2$ plate is arranged between the first optically anisotropic layer and the second optically anisotropic layer.

[4] The optical element as described in [3],
in which in the liquid crystal alignment pattern of the first optically anisotropic layer and the liquid crystal alignment pattern of the second optically anisotropic layer, the orientation of the optical axis derived from the liquid crystal compound changes while continuously rotating along only one in-plane direction of the optically anisotropic layer, and in the liquid crystal alignment pattern of the first optically anisotropic layer and the liquid crystal alignment pattern of the second optically anisotropic layer, the one in-plane directions are the same.

[5] The optical element as described in any one of [1] to [4], in which the optical element has a plurality of sets of combinations of the switching λ/2 plate and the first optically anisotropic layer.

[6] An image display device comprising:

the optical element as described in any one of [1] to [5]; and a display that irradiates the optical element with an image.

[7] The image display device as described in [6], in which the display irradiates the optical element with the image at an angle with respect to a normal line of a main surface of the light guide plate.

[8] The image display device as described in [6], in which the optical element has the second optically anisotropic layer and the display irradiates the optical element with the image in a normal direction of a main surface of the light guide plate.

[9] The image display device as described in any one of [6] to [8], in which the display irradiates a circular polarization image.

[10] The image display device as described in any one of [6] to [9], in which the display divides the image into a plurality of images and displays the divided images in a time-division manner.

[11] The image display device as described in [10], in which the time-division display of the image by the display and the switching of a phase difference by the switching λ/2 plate are synchronized.

According to the optical element of the embodiment of the present invention, incidence light can be incident into a light guide plate at a plurality of different angles and emitted from the light guide plate. In addition, the image display device of an embodiment of the present invention can display an image with a wide field of view, for example, in a case of being used for an AR glass.

DESCRIPTION OF THE PREFERRED EMBODIMENTS

Hereinafter, an optical element and an image display device of the embodiments of the present invention will be described in detail, based on suitable Examples shown in the accompanying drawings.

In the present specification, a numerical range represented by "to" means a range inclusively defined by numerical values before and after "to" as a lower limit value and an upper limit value, respectively.

In the present specification, a term "(meth)acrylate" is used to mean "either or both of acrylate and methacrylate".

In the present specification, an expression "the same" is used to include error ranges that are generally allowable in the technical field.

In the present specification, Re(λ) represents an in-plane retardation at a wavelength of λ. The wavelength of λ refers to 550 nm unless otherwise specified.

In the present specification, Re(λ) is a value measured at the wavelength of λ using AxoScan (manufactured by Axometrics, Inc.). By inputting an average refractive index ((nx+ny+nz)/3) and a film thickness (d (μm)) to AxoScan, the value can be calculated:

Slow Axis Direction (°)

$Re(λ)=R0(λ).$

Furthermore, R0(λ) is displayed as a numerical value calculated by AxoScan, but means Re(λ).

Figure 1:
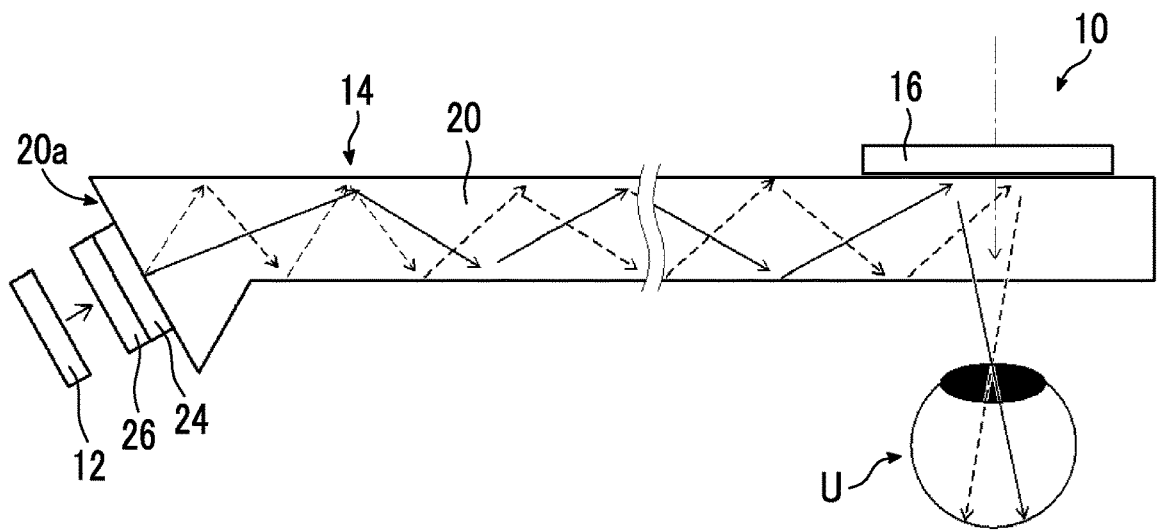
FIG. 1 is a view conceptually showing an example of an image display device of the embodiment of the present invention using an optical element of the embodiment of the present invention.

FIG. 1 conceptually shows an example of an image display device of the embodiment of the present invention using an optical element of the embodiment of the present invention.

By way a suitable example, an image display device 10 shown in FIG. 1 is used as an AR glass. Further, the optical element of the embodiment of the present invention can be used not only for an AR glass but also for an optical element such as a transparent display and a head-up display. In addition, the image display device of the embodiment of the present invention can also be used for an image display device using the optical element.

Such the image display device 10 has a display 12, an optical element 14 of the embodiment of the present invention, and a diffraction element 16.

As will be described later, the optical element 14 of the embodiment of the present invention includes a light guide plate 20, a liquid crystal diffraction element 24, and a switching λ/2 plate 26 (see FIG. 2).

[Display]

The display 12 displays an image (video) observed by a user U and irradiates the optical element 14 with an image.

In the example shown in the drawing, the display 12 irradiates the switching λ/2 plate 26 with a displayed image.

In the image display device 10 of the embodiment of the present invention, the display 12 switches an image to be displayed, depending on the switching of a phase difference by the switching λ/2 plate 26 which will be described later.

By way of example, the display 12 divides the image to be displayed into two images (two screens), that is, a right-side image and a left-side image, and alternately switches and displays the right-side image and the left-side image, depending on the switching of the phase difference by the switching λ/2 plate 26. That is, the display 12 divides the display image into the right-side image and the left-side image, and the display image is displayed in a time-division manner into the right-side image and the left-side image in synchronization with the switching of the phase difference by the switching λ/2 plate 26.

In the image display device 10 of the embodiment of the present invention, the display 12 is not limited, and various well-known displays (projectors) used for AR glasses, for example, can be used.

Examples of the display 12 include a liquid crystal display and an organic electroluminescence display. Examples of the liquid crystal display include a reflection type liquid crystal display element (liquid crystal on silicon (LCOS)).

In addition, the image display device 10 may have various optical elements used for AR glasses and the like, such as a condenser lens that condenses the image displayed by the display 12, as necessary.

The display 12 irradiates a circular polarization image. Accordingly, in a case where the display body irradiates a non-polarization image, the display 12 has, for example, a circular polarizing plate consisting of a linear polarizer and a λ/4 plate, and in a case where the display body irradiates a linear polarization image, the display 12 has, for example, a λ/4 plate.

In the image display device 10 of the example as shown in the drawing, by way of example, the display 12 irradiates a right-handed circular polarization image.

In the example shown in FIG. 1, the display 12 irradiates the optical element 14 with an image at an angle with respect to a normal line of a main surface of the light guide plate 20 which will be described later. Furthermore, the main surface is the maximum area surface of a sheet-shaped object (plate-shaped object, a film). In addition, the normal line of the main surface is a line in the direction orthogonal to the main surface. In the following description, an expression "a normal line of a main surface of the light guide plate 20" is also referred to as "a normal line of the light guide plate 20".

The display 12 irradiates the optical element 14 with an image at an angle in one direction (an arrow X direction in the drawing which will be described later) along which an orientation of an optical axis 36A of a liquid crystal compound 36 changes while rotating in an optically anisotropic layer 34 which will be described later, with respect to a normal line of the light guide plate 20.

The angle formed between the irradiation direction of the image by the display 12 and the normal line of the light guide plate 20 is not limited, and the angle of the incidence light on the light guide plate 20, at which light can be properly guided within the light guide plate 20, may be appropriately set according to a diffraction force of the liquid crystal diffraction element 24 which will be described later, a material (a refractive index and the like) for forming the light guide plate 20, and the like.

Furthermore, in the optical element 14 of the embodiment of the present invention, basically, the normal line of the light guide plate 20 may or may not coincide with a normal line of the main surface of the switching λ/2 plate 26 which will be described later and a normal line of the main surface of the optically anisotropic layer 34 (the first optically anisotropic layer and the second optically anisotropic layer). For example, the light guide plate on the incident side may be formed obliquely such that the switching λ/2 plate and the optically anisotropic layer may be bonded to the tilted surface. Further, the retardation value of the switching λ/2 plate 26 is a value with respect to the advancing direction of light.

[Optical Element]

In the image display device 10 of the embodiment of the present invention, the optical element 14 is an optical element of the embodiment of the present invention.

Figure 2:
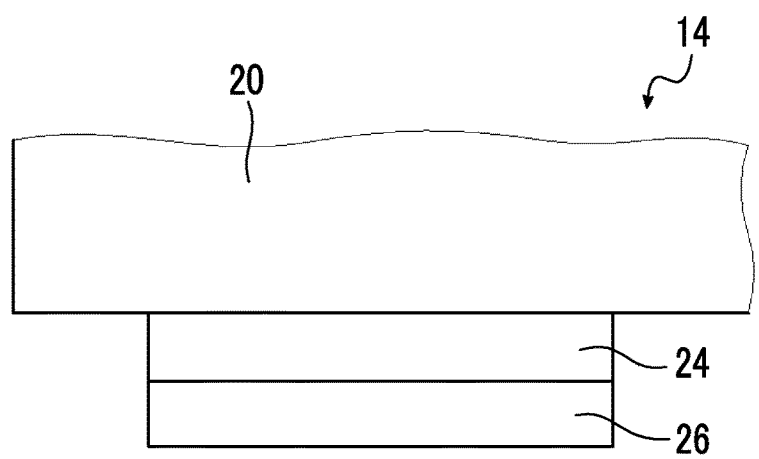
FIG. 2 is a partially enlarged view conceptually showing an optical element of the embodiment of the present invention.

FIG. 2 conceptually shows a partially enlarged view of the optical element 14. As described above, the optical element 14 includes the light guide plate 20, the liquid crystal diffraction element 24, and the switching λ/2 plate 26.

<Light Guide Plate>

In the optical element 14, the light guide plate 20 is a well-known light guide plate that reflects light incident into the inside and guides (propagates) the light, provided that it has a tilted surface 20a which will be described later.

The light guide plate 20 is not limited, and various well-known light guide plates used for AR glasses, backlight units of liquid crystal displays, and the like can be used.

Furthermore, as shown in FIG. 1, the end face of the light guide plate 20 on the opposite side of the diffraction element 16 is the tilted surface 20a that is tilted with respect to a normal line of a main surface of the light guide plate 20. In the image display device 10, the liquid crystal diffraction element 24 which will be described later is provided on the tilted surface 20a. That is, in the light guide plate 20, the tilted surface 20a serves as an incidence surface of an image displayed by the display 12.

<Switching λ/2 Plate>

The switching λ/2 plate 26 is a λ/2 plate capable of switching a phase difference between zero ("0") and λ/2. Further, an expression, the phase difference of the switching λ/2 plate 26 being λ/2, means that the in-plane retardation of the switching λ/2 plate 26 is λ/2. In addition, an expression, the switching λ/2 plate 26 having a phase difference of λ/2, means a plate in which the in-plane retardation Re(λ) at a specific wavelength of λ nm satisfies Re(λ)≈λ/2. This equation may be achieved at any wavelength in the visible region (for example, 550 nm). Above all, it is preferable that the in-plane retardation Re(550) at a wavelength of 550 nm satisfies the following relationship.

$$210 \text{ nm} \leq Re(550) \leq 300 \text{ nm}$$

By way of example, the display 12 displays a left-sided image in a time-division manner in a case where the phase difference of the switching λ/2 plate 26 is zero, and the display 12 displays a right-side image in a time-division manner in a case where the phase difference of the switching λ/2 plate 26 is λ/2.

In addition, as described above, the display 12 irradiates a right-handed circular polarization image. Accordingly, in a case where the phase difference is zero, the switching λ/2 plate 26 transmits the incident right-handed circularly polarized light as it is, and in a case where the phase difference is λ/2, the switching λ/2 plate 26 transmits the incident right-handed circularly polarized light after converting the right-handed circularly polarized light into the left-handed circularly polarized light.

The switching λ/2 plate 26 is not limited, and various well-known λ/2 plates capable of switching a phase difference between zero and λ/2 can be used.

By way of example, a λ/2 liquid crystal cell and a λ/2 plate that electrically switches an alignment of a liquid crystal compound in the liquid crystal cell to adjust a phase difference to zero are exemplified.

By way of more specific example, a switching λ/2 plate using a liquid crystal cell in which two transparent substrates having a transparent electrode and an alignment film that has been subjected to an alignment treatment are arranged to be spaced from each other such that the rubbing directions are antiparallel, and a liquid crystal compound is injected between the transparent substrates is exemplified. This switching λ/2 plate can switch a phase difference between zero and λ/2 by applying different voltages between the transparent electrodes.

Furthermore, in this switching λ/2 plate, the phase difference remains due to a behavior of the liquid crystal compound in some cases in a state where the phase difference is set to zero. At this time, the phase difference may be offset by bonding a birefringent film such that the slow axis of the residual phase difference of the liquid crystal cell and the slow axis of the birefringent film are orthogonal to each other. Specifically, the slow axis of the residual phase difference of the liquid crystal cell is an alignment direction.

As the switching λ/2 plate 26, a cell using a nematic liquid crystal is generally used, but a nematic liquid crystal with a positive birefringence or a negative birefringence can be used. Other than that, a ferroelectric liquid crystal, a reverberant dielectric liquid crystal, or a blue layer liquid crystal can be used. In addition, an EO element device constituted with an electro-optical crystal can also be used.

<Liquid Crystal Diffraction Element>

In the optical element 14, the liquid crystal diffraction element 24 is arranged to be sandwiched between the light guide plate 20 and the switching λ/2 plate 26.

That is, the optical element 14 of the example shown in the drawing has the light guide plate 20, the liquid crystal diffraction element 24, and the switching λ/2 plate 26 laminated in this order.

Although not shown in the drawing, the light guide plate 20 and the liquid crystal diffraction element 24 and the liquid crystal diffraction element 24 and the switching λ/2 plate 26 are bonded by layers provided therebetween, respectively.

In the present invention, as the bonding layer, a bonding layer formed of one of various well-known materials can be used as long as it is a layer that can bond materials as bonding targets. The bonding layer may be any one of a layer formed of an adhesive which has fluidity during bonding and becomes a solid after bonding, a layer formed of a pressure sensitive adhesive which is a gel-shaped (rubber-shaped) soft solid during bonding and has no change in the gel state even after bonding, and a layer formed of a material having characteristics of both the adhesive and the pressure sensitive adhesive. Accordingly, as the bonding layer, a known bonding layer used for bonding sheet-shaped materials in an optical device, an optical element, and the like, such as an optical clear adhesive (OCA), an optically transparent double-sided tape, and an ultraviolet curable resin, may be used.

Alternatively, instead of bonding the layers by the bonding layers, the light guide plate 20, the liquid crystal diffraction element 24, and the switching λ/2 plate 26 may be laminated and held by a frame, a holding device, or the like to constitute the optical element of the embodiment of the present invention.

Furthermore, the optical element of the embodiment of the present invention is not limited to a configuration in which the light guide plate 20, the liquid crystal diffraction element 24, and the switching λ/2 plate 26 are laminated in contact with each other as in the example shown in the drawing, and a configuration in which the members are arranged in a state where one or more members are spaced from each other may also be used.

Figure 3:
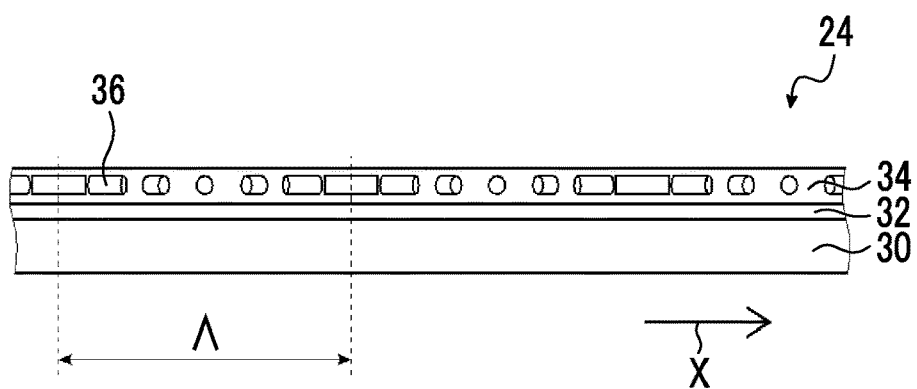
FIG. 3 is a view conceptually showing a liquid crystal diffraction element of the optical element shown in FIG. 1.

FIG. 3 conceptually shows the liquid crystal diffraction element 24. The liquid crystal diffraction element 24 shown in FIG. 3 has a support 30, an alignment film 32, and an optically anisotropic layer 34. In the example shown in the drawing, the optically anisotropic layer 34 of the liquid crystal diffraction element 24 is a first optically anisotropic layer in the present invention.

Furthermore, the optical element 14 of the example shown in the drawing has the support 30, the alignment film 32, and the optically anisotropic layer 34, but the present invention is not limited thereto. The optical element 14 of the embodiment of the present invention may have, for example, only the alignment film 32 and the optically anisotropic layer 34 by peeling the support 30 after bonding the liquid crystal diffraction element 24 to the switching λ/2 plate 26. Alternatively, the optical element 14 of the embodiment of the present invention may have, for example, only the optically anisotropic layer 34 by peeling the support 30 and the alignment film 32 after bonding the liquid crystal diffraction element 24 to the switching λ/2 plate 26.

<<Support>>

In the liquid crystal diffraction element 24, the support 30 supports the alignment film 32 and the optically anisotropic layer 34.

As the support 30, any of various sheet-shaped materials (a film or a plate-shaped material) can be used as long as it can support the alignment film 32 and the optically anisotropic layer 34.

As the support 30, a transparent support is preferable, and examples of the support 30 include a polyacrylic resin film such as polymethyl methacrylate, a cellulose-based resin film such as cellulose triacetate, a cycloolefin polymer-based film, polyethylene terephthalate (PET), polycarbonate, and polyvinyl chloride. Examples of the cycloolefin polymer-based film include a trade name "ARTON", manufactured by JSR Corporation, and a trade name "ZEONOR", manufactured by Zeon Corporation. The support is not limited to a flexible film and may be a non-flexible substrate such as a glass substrate.

The thickness of the support 30 is not limited and the thickness with which the alignment film and the optically anisotropic layer can be held may be appropriately set depending on a material for forming the support 30, and the like.

The thickness of the support 30 is preferably 1 to 1,000 μm, more preferably 3 to 250 μm, and still more preferably 5 to 150 μm.

<<Alignment Film>>

In the liquid crystal diffraction element 24, the alignment film 32 is formed on the surface of the support 30.

The alignment film 32 is an alignment film for aligning the liquid crystal compound 36 in a predetermined liquid crystal alignment pattern in a case where the optically anisotropic layer 34 is formed.

As described below, in the liquid crystal diffraction element 24, the optically anisotropic layer 34 has a liquid crystal alignment pattern in which an orientation of an optical axis 36A (see FIG. 3) derived from the liquid crystal compound 36 changes while continuously rotating along one in-plane direction (the arrow X direction which will be described later). Accordingly, the alignment film of the liquid crystal diffraction element 24 is formed such that the liquid crystal compound 36 of the optically anisotropic layer 34 is aligned in this liquid crystal alignment pattern.

In the following description, an expression, "the orientation of the optical axis 36A rotates" will also be simply referred to as "the optical axis 36A rotates".

As the alignment film 32, various known films can be used.

Examples of the alignment film 32 include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as co-tricosanoic acid, dioctadecylmethylammonium chloride, and methyl stearate.

The alignment film formed by a rubbing treatment can be formed by rubbing a surface of a polymer layer with paper or fabric in a given direction multiple times.

Preferred examples of the material used for the alignment film include a material for forming polyimide, polyvinyl alcohol, a polymer having a polymerizable group described in JP1997-152509A (JP-H09-152509A), or an alignment film such as JP2005-097377A, JP2005-099228A, and JP2005-128503A.

In the liquid crystal diffraction element 24 constituting the optical element 14 of the embodiment of the present invention, the alignment film 32 is suitably used as a so-called photo-alignment film obtained by irradiating a photo-alignable material with polarized light or non-polarized light. That is, in the liquid crystal diffraction element 24, a photo-alignment film that is formed by applying a photo-alignable material onto the support 30 is suitably used as the alignment film 32.

The irradiation of polarized light can be performed in a direction orthogonal or oblique to the photo-alignment film, and the irradiation of non-polarized light can be performed in a direction oblique to the photo-alignment film.

Preferred examples of the photo-alignable material used in the photo-alignment film that can be used in the present invention include the azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; the aromatic ester compounds described in JP2002-229039A; the maleimide- and/or alkenyl-substituted nadimide compounds having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, the azo compounds, the photocrosslinking polyimides, the photocrosslinking polyamides, the photocrosslinking esters, the cinnamate compounds, and the chalcone compounds are suitably used.

The thickness of the alignment film is not limited, and the thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film 32 is not limited, and various known methods depending on a material for forming the alignment film 32 can be used. By way of example, a method in which an alignment film is applied onto a surface of the support 30 and dried, and then, the applied alignment film is exposed to laser light to form an alignment pattern is exemplified.

Figure 11:
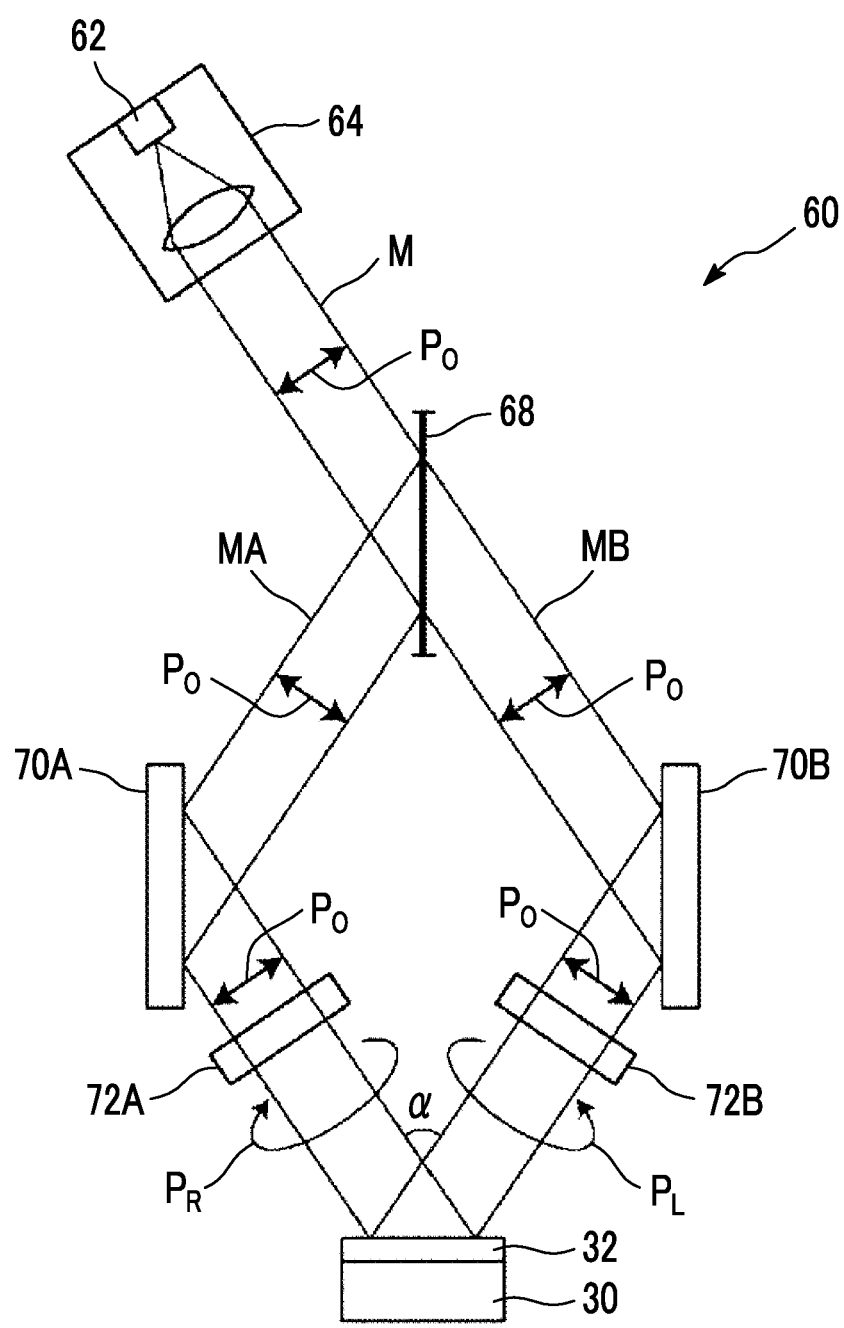
FIG. 11 is a view conceptually showing an example of an exposure device that exposes an alignment film of the liquid crystal diffraction element shown in FIG. 3.

FIG. 11 conceptually shows an example of an exposure device that exposes the alignment film 32 on the surface of the support 30 to form an alignment pattern.

An exposure device 60 shown in FIG. 11 includes a light source 64 comprising a laser 62; a beam splitter 68 that splits laser light M emitted from the laser 62 into two beams MA and MB; mirrors 70A and 70B that are arranged on optical paths of the split two beams MA and MB; and λ/4 plates 72A and 72B.

Furthermore, although not shown in the drawing, the light source 64 comprises a polarizing plate and emits linearly polarized light $P_0$. The λ/4 plates 72A and 72B comprise optical axes orthogonal to each other. The λ/4 plate 72A converts the linearly polarized light $P_0$ (beam MA) into right-handed circularly polarized light $P_R$, and the λ/4 plate 72B converts the linearly polarized light $P_0$ (beam MB) into left-handed circularly polarized light $P_L$.

The support 30 having the alignment film 32 before an alignment pattern is formed thereon is arranged at an exposed area, the two beams MA and MB intersect and interfere with each other on the alignment film 32, and the alignment film 32 is irradiated with the interference light for exposure.

Due to the interference at this time, the polarization state of light with which the alignment film 32 is irradiated periodically changes according to interference fringes. As a result, in the alignment film 32, an alignment pattern in which the alignment state periodically changes can be obtained.

In the exposure device 60, the period of the alignment pattern can be adjusted by changing an intersection angle α between the two beams MA and MB. That is, in the exposure device 60, the length of the single period in which the optical axis 36A rotates by 180° in the one direction along which the optical axis 36A rotates can be controlled in an alignment pattern in which the optical axis 36A derived from the liquid crystal compound 36 continuously rotates along one direction by controlling the intersection angle α.

By forming the optically anisotropic layer 34 on the alignment film 32 having an alignment pattern in which such the alignment state changes periodically, it is possible to form an optically anisotropic layer 34 having a liquid crystal alignment pattern in which the optical axis 36A derived from the liquid crystal compound 36 continuously rotates toward one direction, as described below.

In addition, by rotating each of the optical axes of the λ/4 plates 72A and 72B by 90°, it is possible to reverse the rotation direction of the optical axis 36A.

Furthermore, in the optical element of the embodiment of the present invention, the alignment film 32 is provided in a preferable aspect, and is not an essential configuration requirement.

By forming an alignment pattern on the support 30 by a method of subjecting the support 30 to a rubbing treatment, a method of processing the support 30 with laser light or the like, and other methods, it is also possible to adopt a configuration in which the optically anisotropic layer 34 has a liquid crystal alignment pattern in which an orientation of the optical axis 36A derived from the liquid crystal compound 36 changes while continuously rotating along at least one in-plane direction of the optically anisotropic layer 34. That is, in the present invention, the support 30 may also act as an alignment film.

<<Optically Anisotropic Layer>>

In the liquid crystal diffraction element 24, an optically anisotropic layer 34 is formed on the surface of the alignment film 32.

Furthermore, in order to simplify the drawing to clarify the configuration of the liquid crystal diffraction element 24 in FIG. 3, only the liquid crystal compound 36 (liquid crystal compound molecules) on the surface of the alignment film in the optically anisotropic layer 34 is shown. However, as conceptually shown in FIG. 4, the optically anisotropic layer 34 has a structure in which the aligned liquid crystal compounds 36 are stacked in the same manner as in the optically anisotropic layer formed using a composition including an ordinary liquid crystal compound. With regard to this, the same shall also apply to FIGS. 6 and 7 which will be described below.

As described above, in the liquid crystal diffraction element 24, the optically anisotropic layer 34 is formed using a composition including the liquid crystal compound 36.

In a case where the in-plane retardation value is set to λ/2, the optically anisotropic layer 34 has a function as a general λ/2 plate, that is, a function of giving a phase difference of a half wavelength, that is, 180° to the two linear polarization components orthogonal to each other, which are included in the light incident into the optically anisotropic layer.

The optically anisotropic layer 34 has a liquid crystal alignment pattern in which an orientation of an optical axis derived from the liquid crystal compound changes while continuously rotating in one direction indicated by the arrow X in the plane.

As described above, the display 12 irradiates the optical element 14 with an image at an angle in the arrow X direction (upstream side or downstream side) with respect to a normal line of the light guide plate 20. In the following description, an expression "at an angle with respect to a normal line of the light guide plate 20" is also referred to as "with a tilt with respect to a normal line of the light guide plate 20".

Furthermore, the optical axis 36A derived from the liquid crystal compound 36 is an axis having the highest refractive index in the liquid crystal compound 36, that is, a so-called slow axis. For example, in a case where the liquid crystal compound 36 is a rod-shaped liquid crystal compound, the optical axis 36A is along a rod-shaped major axis direction.

In the following description, an expression "one direction indicated by an arrow X" will also be simply referred to as "the arrow X direction". In addition, in the following description, the optical axis 36A derived from the liquid crystal compound 36 will also be referred to as "the optical axis 36A of the liquid crystal compound 36" or "the optical axis 36A".

In the optically anisotropic layer, the liquid crystal compounds 36 are each two-dimensionally aligned in the plane parallel to the arrow X direction and the Y direction orthogonal to the arrow X direction in the optically anisotropic layer. Further, in FIGS. 1 to 4 and FIGS. 6 and 7 which will be described below, the Y direction is a direction orthogonal to the paper plane.

Figure 5:
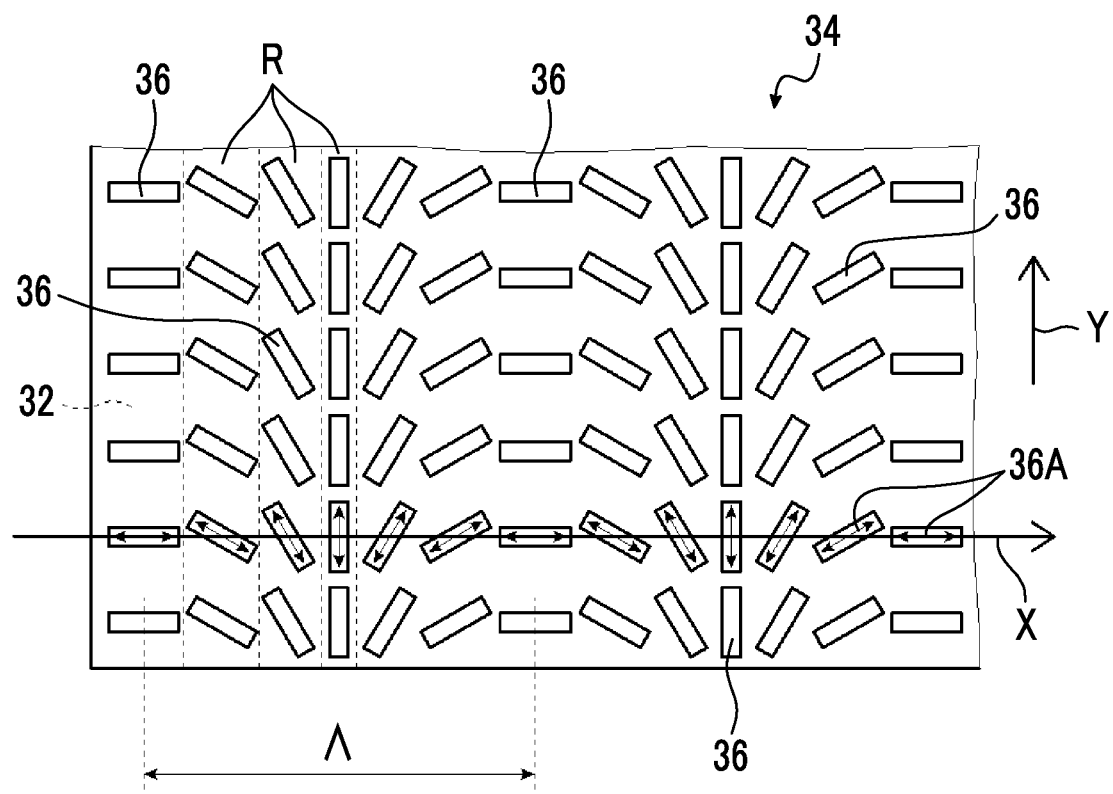
FIG. 5 is a schematic plan view of an optically anisotropic layer of the liquid crystal diffraction element shown in FIG. 3.

FIG. 5 conceptually shows a plan view of the optically anisotropic layer 34.

Furthermore, the plan view is a view in a case where the liquid crystal diffraction element 24 is seen from the top in FIG. 3, that is, a view in a case where the liquid crystal diffraction element 24 is seen from a thickness direction. In other words, it is a view in a case where the optically anisotropic layer 34 is seen from a direction orthogonal to the main surface. The thickness direction is, that is, the laminating direction of each layer (film).

Figure 4:
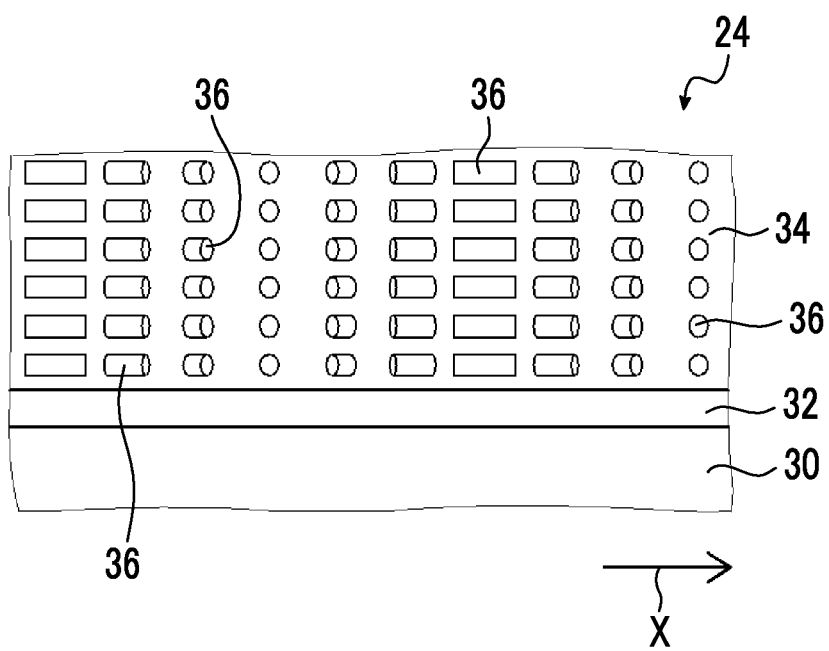
FIG. 4 is a conceptual view for explaining a configuration of the liquid crystal diffraction element shown in FIG. 3.

In addition, in order to clarify the configuration of the liquid crystal diffraction element 24 in FIG. 5, only the liquid crystal compound 36 on the surface of the alignment film 32 is shown with regard to the liquid crystal compound 36, as in FIG. 3. However, the optically anisotropic layer 34 has a structure in which the liquid crystal compounds 36 are laminated from the liquid crystal compound 36 on the surface of the alignment film 32, as shown in FIG. 4, in the thickness direction, which is the same as described above.

The optically anisotropic layer 34 has a liquid crystal alignment pattern in which an orientation of the optical axis 36A derived from the liquid crystal compound 36 changes while continuously rotating along the arrow X direction, that is, in one direction indicated by an arrow X in the plane.

Specifically, an expression "the orientation of the optical axis 36A of the liquid crystal compound 36 changes while continuously rotating along the arrow X direction (one in-plane direction)" means that an angle between the optical axis 36A of the liquid crystal compound 36 arranged along the arrow X direction and the arrow X direction differs depending on positions in the arrow X direction, and the angle between the optical axis 36A and the arrow X direction sequentially changes from θ to θ+180° or θ−180° along the arrow X direction.

A difference between the angles of the optical axes 36A of the liquid crystal compound 36 adjacent to each other in the arrow X direction is preferably 45° or less, more preferably 15° or less, and still more preferably less than 15°.

On the other hand, with regard to the liquid crystal compounds 36 that form the optically anisotropic layer 34, the liquid crystal compounds 36 having the same orientations of the optical axes 36A are arranged at equal intervals in the Y direction orthogonal to the arrow X direction, that is, the Y direction orthogonal to the one direction along which the optical axis 36A continuously rotates.

In other words, in the liquid crystal compounds 36 that form the optically anisotropic layer 34, the angles formed between the orientations of the optical axes 36A and the arrow X direction are the same among the liquid crystal compounds 36 arranged in the Y direction.

In the optically anisotropic layer 34, the length (distance) over which the optical axis 36A of the liquid crystal compound 36 rotates by 180° in the arrow X direction along which the orientation of the optical axis 36A changes while continuously rotating in the liquid crystal alignment pattern of the liquid crystal compound 36 in the plane is defined as a length Λ of the single period in the liquid crystal alignment pattern. In other words, the length of the single period in the liquid crystal alignment pattern is defined by a distance such that an angle formed between the optical axis 36A of the liquid crystal compound 36 and the arrow X direction reaches from θ to θ+180°.

That is, a distance between centers of two liquid crystal compounds 36 in the arrow X direction is the length Λ of the single period, the two liquid crystal compounds having the same angle in the arrow X direction. Specifically, as shown in FIGS. 3 and 5, a distance between the centers of the two liquid crystal compounds 36 in the arrow X direction, in which the arrow X direction and the direction of the optical axis 36A coincide with each other, is taken as the length Λ of the single period. In the following description, the length Λ of the single period will also be referred to as the "single period Λ".

In the liquid crystal alignment pattern of the optically anisotropic layer 34, the single period Λ is repeated in the arrow X direction, that is, in the one direction along which the orientation of the optical axis 36A changes while continuously rotating.

As described above, in the optically anisotropic layer 34, the liquid crystal compounds arranged in the Y direction have the same angles formed between the optical axis 36A and the arrow X direction. The arrow X direction is the one direction along which the orientation of the optical axis of the liquid crystal compound 36 rotates. A region where the liquid crystal compounds 36 having the same angles formed between the optical axis 36A and the arrow X direction are arranged in the Y direction is defined as a region R.

In this case, it is preferable that the value of the in-plane retardation (Re) in each region R is a half wavelength, that is, λ/2. The in-plane retardation is calculated by the product of a difference Δn in a refractive index generated by refractive index anisotropy of the region R and the thickness of the optically anisotropic layer. Here, the difference in refractive index generated by refractive index anisotropy of the region R in the optically anisotropic layer is defined by a difference between a refractive index of a direction of an in-plane slow axis of the region R and a refractive index of a direction orthogonal to the direction of the slow axis. That is, the difference Δn in refractive index generated by refractive index anisotropy of the region R is the same as the difference between a refractive index of the liquid crystal compound 36 in the direction of the optical axis 36A and a refractive index of the liquid crystal compound 36 in a direction orthogonal to the optical axis 36A in a plane of the region R. That is, the difference Δn in refractive index is the same as the difference in refractive index of the liquid crystal compound 36.

In a case where circularly polarized light is incident into such the optically anisotropic layer 34, the light is refracted and the direction of circularly polarized light is converted. This action is conceptually shown in FIGS. 6 and 7. Further, in the optically anisotropic layer 34, the value of the product of the difference in the refractive index of the liquid crystal compound and the thickness of the optically anisotropic layer is λ/2.

Figure 6:
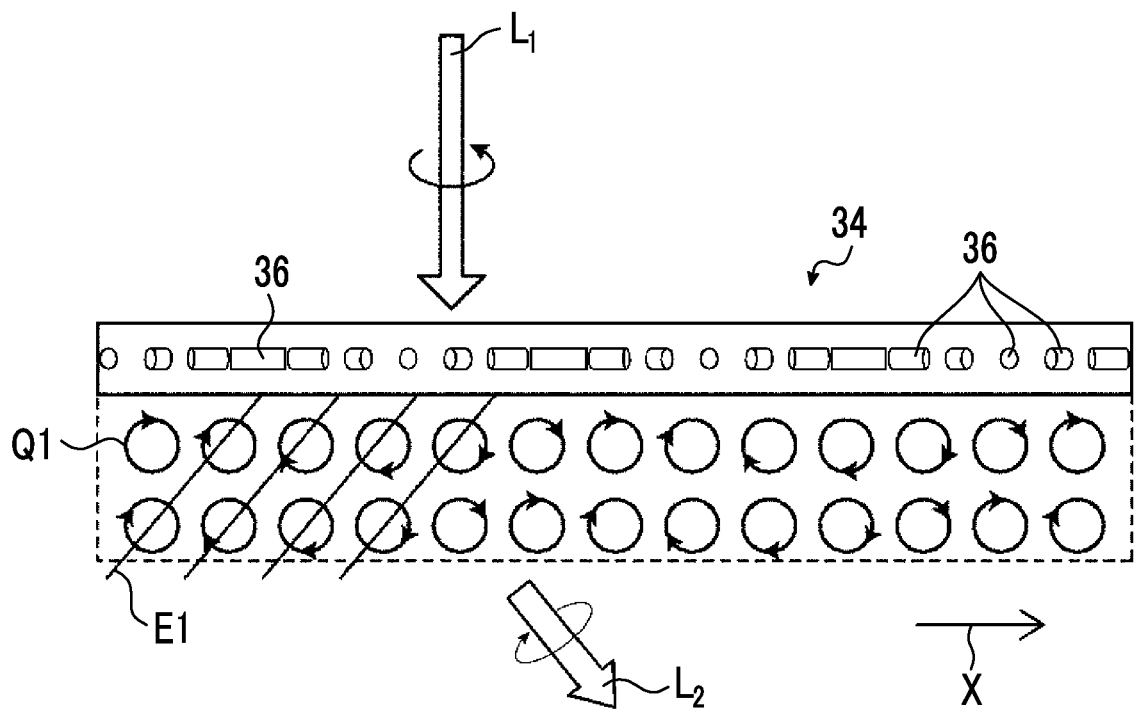
FIG. 6 is a conceptual view showing an action of the optically anisotropic layer of the liquid crystal diffraction element shown in FIG. 3.

As shown in FIG. 6, in a case where a value of the product of the difference in refractive index of the liquid crystal compound of the optically anisotropic layer 34 and the thickness of the optically anisotropic layer is λ/2 and incidence light $L_1$ that is left-handed circularly polarized light is incident into the optically anisotropic layer 34, the incidence light $L_1$ passes through the optically anisotropic layer 34 to be imparted with a phase difference of 180° such that the transmitted light $L_2$ is converted into right-handed circularly polarized light.

In addition, in a case where the incidence light $L_1$ passes through the optically anisotropic layer 34, an absolute phase thereof changes depending on the orientation of the optical axis 36A of each of the liquid crystal compounds 36. At this time, since the orientation of the optical axis 36A changes while rotating along the arrow X direction, the amount of change in the absolute phase of the incidence light $L_1$ differs depending on the orientation of the optical axis 36A. In addition, since the liquid crystal alignment pattern formed on the optically anisotropic layer 34 is a pattern that is periodic in the arrow X direction, the incidence light $L_1$ that has passed through the optically anisotropic layer 34 is imparted with an absolute phase Q1 that is periodic in the arrow X direction corresponding to the orientation of each of the optical axes 36A, as shown in FIG. 6. As a result, an equiphase surface E1 that is tilted in a direction opposite to the arrow X direction is formed.

Therefore, the transmitted light $L_2$ is refracted so as to be tilted toward a direction orthogonal to the equiphase surface E1, and advances in a direction different from the advancing direction of the incidence light $L_1$. Thus, the incidence light $L_1$ of the left-handed circularly polarized light is converted into transmitted light $L_2$ of right-handed circularly polarized light that is tilted by a certain angle in the arrow X direction with respect to the incident direction.

Figure 7:
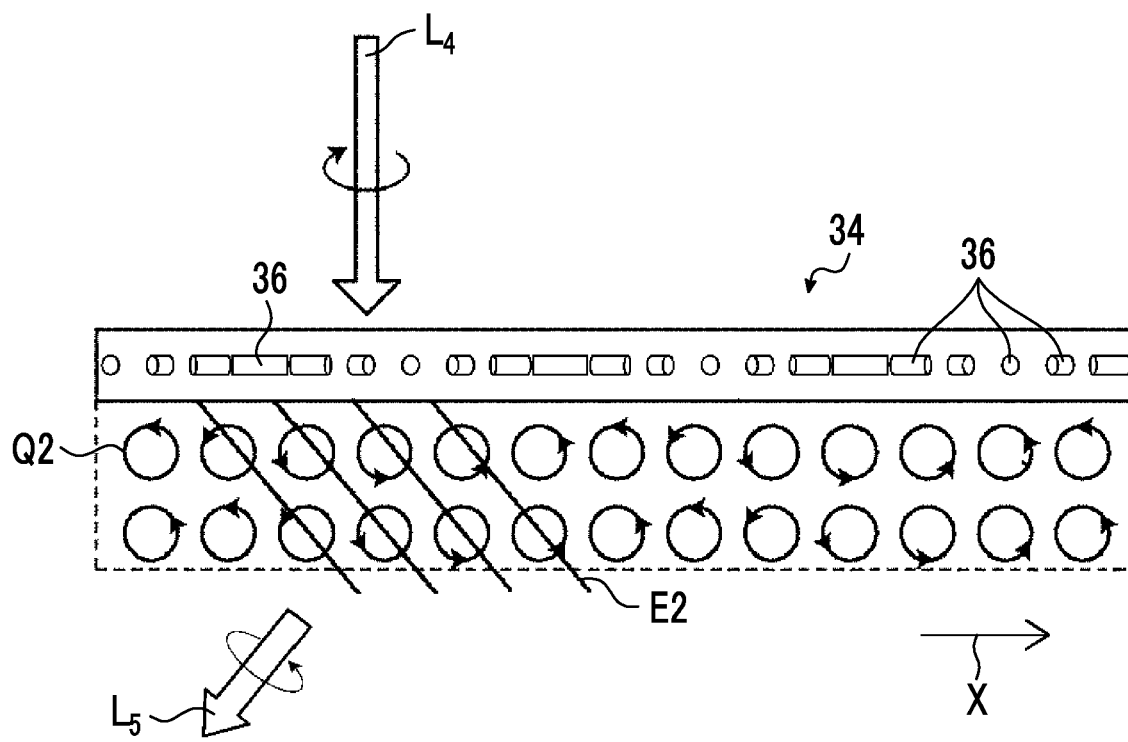
FIG. 7 is a conceptual view showing an action of the optically anisotropic layer of the liquid crystal diffraction element shown in FIG. 3.

On the other hand, in a case where the value of the product of the difference in refractive index of the liquid crystal compound of the optically anisotropic layer 34 and the thickness of the optically anisotropic layer is λ/2, as shown in FIG. 7, as incidence light $L_4$ of right-handed circularly polarized light is incident into the optically anisotropic layer 34, the incidence light $L_4$ passes through the optically anisotropic layer 34, thereby imparting a phase difference of 180°, and is converted into transmitted light $L_5$ of left-handed circularly polarized light.

In addition, in a case where the incidence light $L_4$ passes through the optically anisotropic layer 34, an absolute phase thereof changes depending on the orientation of the optical axis 36A of each of the liquid crystal compounds 36. At this time, since the orientation of the optical axis 36A changes while rotating along the arrow X direction, the amount of change in the absolute phase of the incidence light $L_4$ differs depending on the orientation of the optical axis 36A. In addition, since the liquid crystal alignment pattern formed on the optically anisotropic layer 34 is a pattern that is periodic in the arrow X direction, the incidence light $L_4$ that has passed through the optically anisotropic layer 34 is imparted with an absolute phase Q2 that is periodic in the arrow X direction corresponding to the orientation of each of the optical axes 36A, as shown in FIG. 5.

Here, the incidence light $L_4$ is right-handed circularly polarized light, and thus, an absolute phase Q2 that is periodic in the arrow X direction corresponding to the orientation of the optical axis 36A is opposite to the incidence light $L_1$ as left-handed circularly polarized light. As a result, in the incidence light $L_4$, an equiphase surface E2 with a tilt in the arrow X direction opposite to that of the incidence light $L_1$ is formed.

Therefore, the incidence light $L_4$ is refracted to be tilted toward a direction orthogonal to the equiphase surface E2, and advances in a direction different from an advancing direction of the incidence light $L_4$. Thus the incidence light $L_4$ is converted into transmitted light $L_5$ of left-handed circularly polarized light that is tilted by a certain angle in a direction opposite to the arrow X direction with respect to the incident direction.

In the optically anisotropic layer 34, the value of an in-plane retardation of a plurality of regions R is preferably a half wavelength, but it is preferable that an in-plane retardation $Re(550)=\Delta n_{550} \times d$ of the plurality of regions R of the optically anisotropic layer 34 with respect to the incidence light with a wavelength of 550 nm is within a range defined by Expression (1). Here, $\Delta n_{550}$ is a difference in refractive index generated by the refractive index anisotropy of the region R in a case where the wavelength of the incidence light is 550 nm, and d is the thickness of the optically anisotropic layer 34.

$$200 \text{ nm} \leq \Delta n_{550} \times d \leq 350 \text{ nm} \quad (1)$$

That is, in a case where the in-plane retardation Re(550)=$\Delta n_{550} \times d$ of the plurality of regions R of the optically anisotropic layer 34 satisfies Expression (1), a sufficient amount of a circular polarization component in light that is incident into the optically anisotropic layer 34 can be converted into circularly polarized light that advances in a direction tilted in a forward direction or reverse direction with respect to the arrow X direction. The in-plane retardation Re(550)=$\Delta n_{550} \times d$ more preferably satisfies 225 nm≤$\Delta n_{550} \times d$≤340 nm, and still more preferably satisfies 250 nm≤$\Delta n_{550} \times d$≤330 nm.

Furthermore, Expression (1) is a range with respect to incidence light with a wavelength of 550 nm, but the in-plane retardation Re(λ)=$\Delta n_\lambda \times d$ of the plurality of regions R of the optically anisotropic layer with respect to incidence light with a wavelength of λ nm is preferably within a range defined by Expression (1-2) and can be appropriately set.

$$0.7\lambda \text{ nm} \leq \Delta n_\lambda \times d \leq 1.3\lambda \text{ nm} \quad (1\text{-}2)$$

In addition, the value of the in-plane retardation of the plurality of regions R in the optically anisotropic layer 34 which is outside the range of Expression (1) can also be used. Specifically, by satisfying $\Delta n_{550} \times d \leq 200$ nm or 350 nm≤$\Delta n_{550} \times d$, the light can be classified into light that advances in the same direction as the advancing direction of the incidence light and light that advances in a direction different from the advancing direction of the incidence light. In a case where $\Delta n_{550} \times d$ is closer to 0 nm or 550 nm, the amount of the light component that advances in the same direction as the advancing direction of the incidence light increases, and the amount of the light component that advances in a direction different from the advancing direction of the incidence light decreases.

In addition, it is preferable that the in-plane retardation Re(450)=$\Delta n_{450} \times d$ of each of the regions R of the optically anisotropic layer 34 with respect to incidence light with a wavelength of 450 nm and then in-plane retardation Re(550)=$\Delta n_{550} \times d$ of each of the regions R of the optically anisotropic layer 34 with respect to incidence light with a wavelength of 550 nm satisfy Expression (2). Here, $\Delta n_{450}$ is a difference in refractive index generated by refractive index anisotropy of the region R in a case where the wavelength of the incidence light is 450 nm.

$$(\Delta n_{450} \times d)/(\Delta n_{550} \times d) < 1.0 \quad (2)$$

Expression (2) represents that the liquid crystal compound 36 included in the optically anisotropic layer 34 has reverse dispersibility. That is, by satisfying Expression (2), the optically anisotropic layer 34 can correspond to the incidence light having a wide range of wavelength.

By changing the single period Λ of the liquid crystal alignment pattern formed in the optically anisotropic layer 34, the refraction angles of the transmitted light components $L_2$ and $L_5$ can be adjusted.

Specifically, as the single period Λ of the liquid crystal alignment pattern decreases, the light components that have passed through the liquid crystal compounds 36 adjacent to each other more strongly interfere with each other, and therefore, the transmitted light components $L_2$ and $L_5$ can be greatly refracted.

In addition, by reversing the rotation direction of the optical axis 36A of the liquid crystal compound 36 that rotates along the arrow X direction, the refraction direction of the transmitted light can be reversed. That is, in the examples shown in FIGS. 3 to 7, the rotation direction of the optical axis 36A toward the arrow X direction is clockwise, but by reversing this rotation direction to be counterclockwise, the refraction direction of transmitted light can be reversed.

The optically anisotropic layer 34 consists of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

The optically anisotropic layer 34 consisting of a cured layer of the liquid crystal composition can be obtained by forming an alignment film 32 on the support 30, applying the liquid crystal composition on the alignment film 32, and curing the liquid crystal composition. Furthermore, although it is the optically anisotropic layer 34 that functions as a so-called λ/2 plate, the present invention also encompasses an aspect in which a laminate integrally comprising the support 30 and the alignment film 32 functions as the λ/2 plate.

In addition, the liquid crystal composition for forming the optically anisotropic layer 34 includes a rod-shaped liquid crystal compound or a disk-shaped liquid crystal compound, and may further include other components such as a leveling agent, an alignment control agent, a polymerization initiator, and an alignment assisting agent.

Moreover, the optically anisotropic layer 34 desirably has a wide range of the wavelength of incidence light, and is preferably constituted with a liquid crystal material having reverse dispersion of a birefringence. In addition, it is also preferable that the optically anisotropic layer can be made to have a substantially wide range for the wavelength of incidence light by imparting a torsion component to the liquid crystal composition or by laminating different phase difference layers. For example, in the optically anisotropic layer, a method of realizing a λ/2 plate having a wide-range pattern by laminating two liquid crystal layers having different twisted directions is disclosed in JP2014-089476A and can be preferably used in the present invention.

—Rod-Shaped Liquid Crystal Compound—

As the rod-shaped liquid crystal compound, azomethine compounds, azoxy compounds, cyanobiphenyl compounds, cyanophenyl ester compounds, benzoic ester compounds, phenyl cyclohexanecarboxylic ester compounds, cyanophenylcyclohexane compounds, cyano-substituted phenylpyrimidine compounds, alkoxy-substituted phenylpyrimidine compounds, phenyldioxane compounds, tolane compounds, or alkenylcyclohexylbenzonitrile compounds are preferably used. As the rod-shaped liquid crystal compound, not only the low-molecular-weight liquid crystal molecules as described above but also high-molecular-weight liquid crystal molecules can be used.

It is preferable that the alignment of the rod-shaped liquid crystal compound is immobilized by polymerization, and as the polymerizable rod-shaped liquid crystal compound, the compounds described in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP1999-080081A (JP-H11-080081A), JP2001-064627A, and the like can be used. In addition, as the rod-shaped liquid crystal compound, for example, the compounds described in JP1999-513019A (JP-H11-513019A) and JP2007-279688A can be preferably used.

—Disk-Shaped Liquid Crystal Compound—

As the disk-shaped liquid crystal compound, for example, the compounds described in JP2007-108732A and JP2010-244038A can be preferably used.

Figure 8:
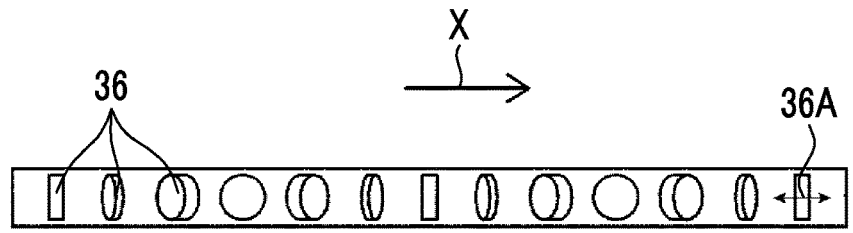
FIG. 8 is a view conceptually showing another example of an optically anisotropic layer of an optical element of the embodiment of the present invention.

Furthermore, in a case where the disk-shaped liquid crystal compound is used in an optically anisotropic layer, the liquid crystal compound 36 rises in the thickness direction in the optically anisotropic layer, and the optical axis 36A derived from the liquid crystal compound is defined as an axis orthogonal to a disc surface, that is a so-called fast axis (see FIG. 8).

[Diffraction Grating]

In the image display device 10, a diffraction element 16 (diffraction grating) is spaced from the liquid crystal diffraction element 24 in the plane direction, and attached to the light guide plate 20. The diffraction element 16 is spaced in the direction opposite to the one direction along which the optical axis 36A rotates in the optically anisotropic layer 34 of the liquid crystal diffraction element 24, that is, the arrow X direction in the plane direction of the light guide plate 20, and is attached to the opposite side to the liquid crystal diffraction element 24.

Furthermore, a method of attaching the diffraction element 16 is not limited, and examples thereof include the method of attaching the liquid crystal diffraction element 24 and the light guide plate 20 described above.

The diffraction element 16 is not limited and various diffraction elements used for extracting light, which has been guided (propagated) in a light guide plate, from the light guide plate can be used in AR glasses and the like.

By way of example, a surface relief type diffraction element having fine irregularities formed on a transparent substrate, a holographic diffraction element, the liquid crystal element described in JP2017-522601A, the liquid crystal element using a cholesteric liquid crystal described in WO2016/194961A, and the like are exemplified.

Furthermore, the diffraction element may be provided on the same side as the liquid crystal diffraction element 24 or the like of the light guide plate 20.

<Action of Image Display Device>

Hereinafter, the present invention will be described in more detail by explaining the action of the image display device 10.

In the image display device 10 of the example shown in the drawing, the display 12 irradiates the switching λ/2 plate 26 with an image with a tilt in the arrow X direction with respect to a normal line of the light guide plate 20. In the example shown in the drawing, the display 12 irradiates the switching λ/2 plate 26 with an image with a tilt with respect to the arrow X direction with respect to a normal line of the light guide plate 20 toward a direction opposite to the arrow X direction.

In addition, the display 12 divides an image to be displayed, that is, an image observed by a user U into a right-side image and a left-side image, and the display image is displayed in a time-division manner into the right-side image and the left-side image in synchronization with the switching of the phase difference by the switching λ/2 plate 26. In the present example, by way of example, the display 12 displays a left-sided image in a case where the phase difference of the switching λ/2 plate 26 is zero, and the display 12 displays a right-side image in a case where the phase difference of the switching λ/2 plate 26 is λ/2.

The switching λ/2 plate 26 switches a phase difference between zero and λ/2 at predetermined time intervals.

As described above, by way of example, the display 12 irradiates a right-handed circular polarization image. Accordingly, in a case where the phase difference of the switching λ/2 plate 26 is zero, right-handed circularly polarized light is incident into the optically anisotropic layer 34.

As shown in FIG. 7, in a case where the incidence light $L_4$ of right-handed circularly polarized light is incident into the optically anisotropic layer 34, the optically anisotropic layer 34 diffracts the light in a direction opposite to the arrow X direction, and emits transmitted light $L_5$ of left-handed circularly polarized light converted therefrom.

As described above, the display 12 irradiates an image with a tilt with respect to a normal line of the light guide plate 20 toward a direction opposite to the arrow X direction. In addition, the display 12 displays the left-side image in a case where the phase difference between the switching λ/2 plates 26 is zero. Accordingly, the left-side image is further angled in a direction opposite to the arrow X direction with respect to a normal line of the light guide plate 20 by the optically anisotropic layer 34, and is incident into the light guide plate 20 at a shallow angle and guided as shown by the solid line in FIG. 1.

In contrast, in a case where the phase difference of the switching λ/2 plate 26 is λ/2, the right-handed circularly polarized light irradiated by the display 12 is converted into the left-handed circularly polarized light, and the left-handed circularly polarized light is incident into the optically anisotropic layer 34.

As shown in FIG. 6, in a case where the incidence light $L_1$ of left-handed circularly polarized light is incident into the optically anisotropic layer 34, the optically anisotropic layer 34 diffracts the light in the arrow X direction, and emits transmitted light $L_2$ of right-handed circularly polarized light converted therefrom.

As described above, the display 12 irradiates an image with a tilt with respect to a normal line of the light guide plate 20 toward a direction opposite to the arrow X direction. In addition, the display 12 displays the right-side image in a case where the phase difference between the switching λ/2 plates 26 is λ/2. Accordingly, the right-side image is angled back in the direction (arrow X direction) opposite to the irradiation direction by the display 12 by the optically anisotropic layer 34 to reduce the angle in the arrow X direction with respect to a normal line of the light guide plate 20, and the image is incident into the light guide plate 20 at a deep angle as shown by a broken line in FIG. 1.

The right-side image (broken line) and the left-side image (dashed line) incident into the light guide plate 20 at different angles are guided in the light guide plate 20 at different reflection angles, diffracted (refracted) and reflected by the diffraction element 16, emitted from the light guide plate 20, and emitted to the observation position by a user U, whereby an image is displayed.

Here, since the right-side image and the left-side image are guided through different optical paths at different reflection angles, the images are emitted to different positions as an observation position (observation field) by a user U by diffraction by the diffraction element 16.

Furthermore, a part of the external light in the background passes straight through the diffraction element 16 and the light guide plate 20 and is observed by the user U, as shown by the dashed line in FIG. 1.

Thus, in the image display device 10 of the embodiment of the present invention, the right-side image and the left-side image obtained by dividing the display image into the two images are time-divided by the switching of an image by the display 12 and the switching of a phase difference by the switching λ/2 plate 26, and are incident into the light guide plate 20 at different diffraction angles.

Therefore, in the image display device 10 of the embodiment of the present invention, the right-side image and the left-side image obtained by dividing the display image into the two images can be guided by different optical paths having different reflection angles and displayed at different positions. That is, according to the present invention, the time-divided right-side image and left-side image can be emitted to different positions as an observation position by a user U. As a result, according to the present invention, an image can be displayed with a wide field of view (FOV), as compared with AR glasses or the like in the related art, in which light is incident into a light guide plate at one diffraction angle.

In other words, according to the present invention, by time-dividing the display image caused by the display 12 depending on the switching of a phase difference by the switching λ/2 plate 26 while dividing the divided images with two diffraction angles in terms of time (field-sequentially) by the switching of a phase difference by the switching λ/2 plate 26, and incident into the light guide plate 20, an image can be displayed with a wide field of view, as compared with AR glasses or the like in the related art, in which light is incident into a light guide plate at one diffraction angle.

[Other Embodiments]

Figure 9:
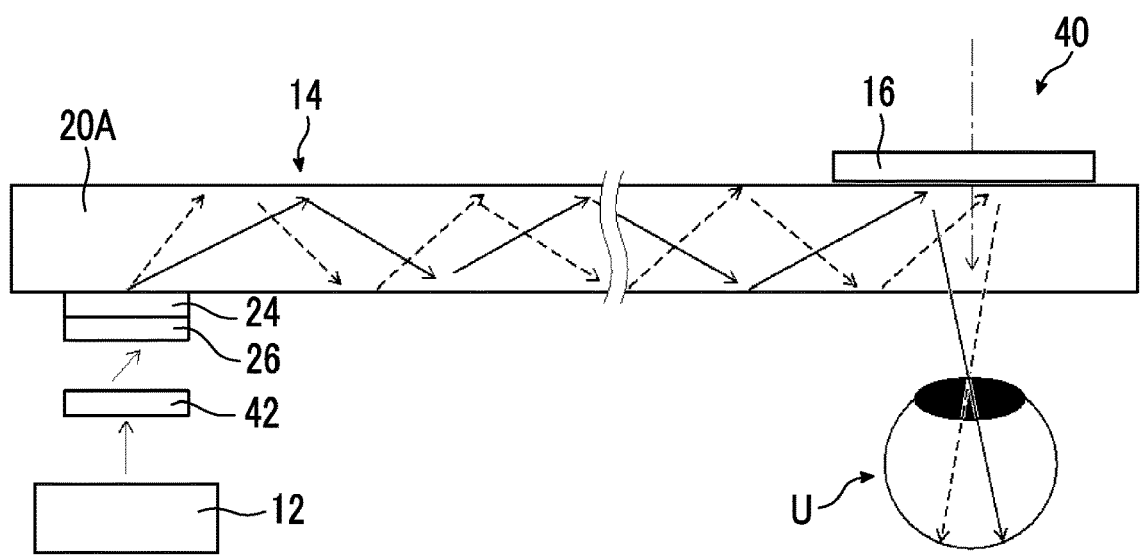
FIG. 9 is a partially enlarged view conceptually showing another example of an image display device of the embodiment of the present invention using another example of an optical element of the embodiment of the present invention.

FIG. 9 shows a partially enlarged view of another aspect of the optical element and the image display device of the embodiments of the present invention.

Furthermore, since an image display device 40 shown in FIG. 9 uses the same members as in the image display device 10 described above, the same members are represented by the same reference numerals, and different sites will be mainly described below. It should be noted that in the image display device 40 shown in FIG. 9, a light guide plate 20A is an ordinary flat plate-shaped light guide plate having no tilted surface as an incidence surface of light on the end face. With regard to this point, the same shall also apply to FIG. 10 which will be described below.

The image display device 40 shown in FIG. 9 is preferably provided with a liquid crystal diffraction element 42 in addition to the image display device 10 (optical element 14) described above. Accordingly, although omitted in FIG. 9, the image display device 40 has a diffraction element 16, as in the image display device 10 shown in FIG. 1, on the upper face in the drawing near the right end part of the light guide plate 20.

In addition, in FIG. 9, the liquid crystal diffraction element 42 and the switching λ/2 plate 26 are shown to be spaced from each other in order to show the action of the liquid crystal diffraction element 42, but the liquid crystal diffraction element 42 and the switching λ/2 plate 26 may be in close contact with each other in the similar manner as the liquid crystal diffraction element 24 and the switching λ/2 plate 26, or may be spaced from each other as shown in FIG. 9.

The liquid crystal diffraction element 42 is basically the same as the liquid crystal diffraction element 24 described above, and has a support 30, an alignment film 32, and an optically anisotropic layer 34. The optically anisotropic layer 34 of the liquid crystal diffraction element 42 is the second optically anisotropic layer in the present invention.

In the aspect having the liquid crystal diffraction element 42, the switching λ/2 plate 26 is arranged between the liquid crystal diffraction element 24 and the liquid crystal diffraction element 42. Accordingly, the switching λ/2 plate 26 is arranged between the first optically anisotropic layer and the second optically anisotropic layer.

In the image display device 10 described above, the display 12 irradiates the switching λ/2 plate 26 with a right-handed circular polarization image with a tilt with respect to a normal line of the light guide plate 20.

In contrast, in the image display device 40 having the liquid crystal diffraction element 42 (second optically anisotropic layer), a left-handed circular polarization image in the revolving direction opposite to a normal direction of the light guide plate 20 is incident into the liquid crystal diffraction element 42 by the display 12.

In addition, in the image display device 40 shown in FIG. 9, the rotation direction of the optical axis 36A of the liquid crystal compound 36 toward the arrow X direction in the optically anisotropic layer 34 of the liquid crystal diffraction element 42 is a direction opposite to that of the optically anisotropic layer 34 of the liquid crystal diffraction element 24.

That is, as shown in FIG. 5 and the like, in the optically anisotropic layer 34 (first optically anisotropic layer) of the liquid crystal diffraction element 24, the rotation direction of the optical axis 36A toward the arrow X direction is clockwise. In contrast, in the optically anisotropic layer 34 (second optically anisotropic layer) of the liquid crystal diffraction element 42, the rotation direction of the optical axis 36A toward the arrow X direction is counterclockwise.

As described above, the liquid crystal diffraction element 24 and the liquid crystal diffraction element 42 have the same optically anisotropic layer 34, except that the rotation direction of the optical axis 36A is reversed. Accordingly, the one direction along which the optical axis 36A of the liquid crystal compound 36 in the optically anisotropic layer 34 rotates coincides with the arrow X direction.

In addition, as described above, the display 12 irradiates the liquid crystal diffraction element 42 with left-handed circularly polarized light from the normal direction of the light guide plate 20. Further, in the optically anisotropic layer 34 of the liquid crystal diffraction element 42, the rotation direction of the optical axis 36A of the liquid crystal compound 36 toward the arrow X direction is reversed from clockwise to counterclockwise.

Therefore, the incidence light $L_4$ of the left-handed circularly polarized light that is incident into the liquid crystal diffraction element 42 (optically anisotropic layer 34 (second optically anisotropic layer)) is converted into right-handed circularly polarized light and refracted in a direction opposite to the arrow X direction, which is the direction opposite to that in FIG. 6. That is, the transmitted light of the liquid crystal diffraction element 42 (optically anisotropic layer 34) is emitted in the same direction as the transmitted light $L_5$ shown in FIG. 7.

Accordingly, as shown in FIG. 9, the irradiation direction of the image of the display 12, which is incident into the switching λ/2 plate 26, is an irradiation direction opposite to the arrow X direction, which is tilted in the arrow X direction with respect to a normal line of the light guide plate 20, as in the image display device 10 shown in FIG. 1 described above. In addition, the image of the display 12, which is incident into the switching λ/2 plate 26, turns into right-handed circularly polarized light.

That is, since the light incident into the switching λ/2 plate 26 turns into right-handed circularly polarized light irradiated in a direction opposite to the arrow X direction, which is tilted in the arrow X direction with respect to a normal line of the light guide plate 20, as in the image display device 10 shown in FIG. 1, the subsequent actions are the same as those of the image display device 10 shown in FIG. 1 described above.

By sandwiching the switching λ/2 plate 26 and the liquid crystal diffraction element 24 between the image display device 40 shown in FIG. 9 and a liquid crystal diffraction element 42 (second optically anisotropic layer), the image display device 40 realizes a wide field of view as with the image display device 10, and also makes it unnecessary to tilt the irradiation direction of the image from the display 12 with respect to a normal line of the light guide plate 20, whereby the image display device can be miniaturized.

The liquid crystal diffraction element 24 and the liquid crystal diffraction element 42 have the same optically anisotropic layer 34, except that the rotation direction of the optical axis 36A of the liquid crystal compound 36 is the opposite. Accordingly, in the optically anisotropic layer 34, the single period Λ in which the optical axis 36A of the liquid crystal compound 36 rotates by 180° is the same as that of the liquid crystal diffraction element 24 (first optically anisotropic layer) and the liquid crystal diffraction element 42 (second optically anisotropic layer).

However, the present invention is not limited to this, and the single period in the optically anisotropic layer may be different from that of the liquid crystal diffraction element 24 and the liquid crystal diffraction element 42. As described above, the shorter the single period in the optically anisotropic layer, the higher the diffraction force of light in the optically anisotropic layer (liquid crystal diffraction element). Accordingly, in a case where the single period Λ in the optically anisotropic layer is different between the liquid crystal diffraction element 24 and the liquid crystal diffraction element 42, determinations on which single period Λ is shortened, a difference in the single period Λ, and the like may be appropriately set depending on a material for forming the light guide plate 20, a type (Δn and the like) of the liquid crystal compound 36, and the like.

Furthermore, in a case where the liquid crystal diffraction element 24 and the liquid crystal diffraction element 42 have different single periods Λ in the optically anisotropic layer, it is preferable to shorten the single period Λ of the liquid crystal diffraction element 42 on the display 12 side. Thus, the light is greatly bent by the liquid crystal diffraction element 42 and then divided into two small directions by the liquid crystal diffraction element 24, whereby a wide angle range centered on a large bending angle can be obtained.

In addition, in the example shown in FIG. 9, in a preferred aspect in which the image display device 40 can be miniaturized, the display 12 irradiates an image from the normal direction of the light guide plate 20.

However, the aspect having the liquid crystal diffraction element 42 (second optically anisotropic layer) in the present invention is not limited to this, and the display 12 may irradiate the liquid crystal diffraction element 42 with an image from a direction at an angle with respect to a normal line of the light guide plate 20 as in the image display device 10 shown in FIG. 1.

Furthermore, in the image display device 40 shown in FIG. 9, the image irradiated by the display 12 does not necessarily need to be circularly polarized light, and may be a non-polarization image.

However, also in the image display device 40 shown in FIG. 9, it is preferable that the display 12 irradiates the right- or left-handed circularly polarized light in consideration of a utilization efficiency and the like of the image irradiated by the display 12.

Both of the image display device 10 shown in FIG. 1 (FIG. 2) and the image display device 40 shown in FIG. 9 have only a set of a combination of the liquid crystal diffraction element 24 (first optically anisotropic layer) and the switching λ/2 plate 26.

Figure 10:
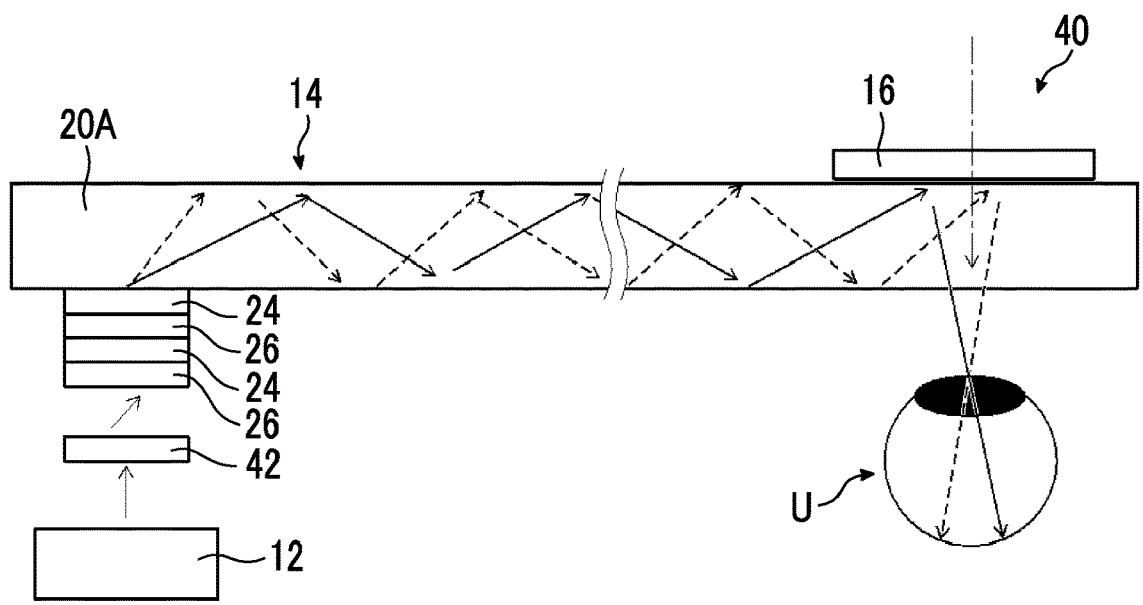
FIG. 10 is a partially enlarged view conceptually showing another example of an optical element of the embodiment of the present invention.

The present invention is not limited to this, and two sets of combinations of the liquid crystal diffraction element 24 and the switching λ/2 plate 26 may be included, or three or more sets of combinations of the liquid crystal diffraction element 24 and the switching λ/2 plate 26 may also be included, as conceptually shown in FIG. 10.

In a case where a plurality of combinations of the liquid crystal diffraction element 24 and the switching λ/2 plate 26 are included, the number of diffraction angles divided in terms of time (field-sequentially) is increased, the number of lights having different angles incident into the light guide plate 20, that is, the number of the divided images is increased, and the field of view is more suitably widened and can be finely controlled.

Furthermore, FIG. 10 illustrates an image display device 40 having the same configuration as that of FIG. 9, using the liquid crystal diffraction element 42 and the flat plate-shaped light guide plate 20A. However, also in a configuration having a plurality of combinations of the liquid crystal diffraction element 24 and the switching λ/2 plate 26, a laminate of the liquid crystal diffraction element 24 and the switching λ/2 plate 26 may be provided on a tilted surface 20a, using a light guide plate 20 having the tilted surface 20a as an incidence surface of light on the end face as shown in FIG. 1.

The optically anisotropic layer shown in FIGS. 3 to 7 is a preferred aspect in which the optical axis 36A of the liquid crystal compound 36 in the liquid crystal alignment pattern of the optically anisotropic layer 34 continuously rotates only along the arrow X direction.

However, the present invention is not limited to this, and there may be a plurality of the one-direction values along which the orientation of the optical axis of the liquid crystal compound 36 changes while continuously rotating as long as the optical axis 36A of the liquid crystal compound 36 continuously rotates along one direction in the optically anisotropic layer.

In the optical element and the image display device of the embodiments of the present invention, a diffraction optical method for enlarging the exit pupil for improving visual recognition can be used.

Specifically, an optical method using a plurality of diffraction elements, that is, a diffraction optical method including inner-coupled, intermediate-coupled, and outer-coupled diffraction elements can be used. The present method is described in detail in JP2008-546020A.

The optical element and the image display device of the embodiments of the present invention have been described above, but the present invention is not limited to the examples described above, and it is obvious that various improvements and modifications can be made within a range not departing from the scope of the present invention.

EXAMPLES

Hereinafter, the characteristics of the present invention will be described in detail with reference to Examples. The materials, the reagents, the amounts, the amounts of materials, the proportions, the treatment details, the treatment procedures, and the like shown in Examples below can be appropriately modified within a range not departing from the spirit of the present invention. Therefore, the scope of the present invention should not be construed as being limited to specific examples shown below.

Example 1

<Preparation of Liquid Crystal Diffraction Element>
(Support and Saponification Treatment of Support)

A commercially available triacetyl cellulose film (manufactured by FUJIFILM Corporation, Z-TAC) was used as a support.

The support was allowed to pass through an induction heating roll at a temperature of 60° C. such that the surface temperature of the support was elevated to 40° C.

Next, an alkali solution shown below was applied onto a single surface of the support using a bar coater in an application amount of 14 mL (liters)/m², and the support was heated to 110° C. and transported for 10 seconds under a steam infrared electric heater (manufactured by Noritake Co., Ltd.).

Subsequently, 3 mL/m² of pure water was applied onto a surface of the support to which the alkali solution had been applied, using the same bar coater. Next, water cleaning using a foundry coater and water draining using an air knife were repeated three times, then the support was transported and dried in a drying zone at 70° C. for 10 seconds, and the surface of the support was subjected to an alkali saponification treatment.

Alkali Solution

| | |
|---|---|
| Potassium hydroxide | 4.70 parts by mass |
| Water | 15.80 parts by mass |
| Isopropanol | 63.70 parts by mass |
| Surfactant | |
| SF-1: $C_{14}H_{29}O(CH_2CH_2O)_2OH$ | 1.0 part by mass |
| Propylene glycol | 14.8 parts by mass |

(Formation of Undercoat Layer)

The following coating solution for forming an undercoat layer was continuously applied onto a surface of the support which had been subjected to an alkali saponification treatment using a #8 wire bar. The support on which the coating film had been formed was dried using warm air at 60° C. for 60 seconds and further dried using warm air at 100° C. for 120 seconds to form an undercoat layer.

Coating Solution for Forming Undercoat Layer

| | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified polyvinyl alcohol

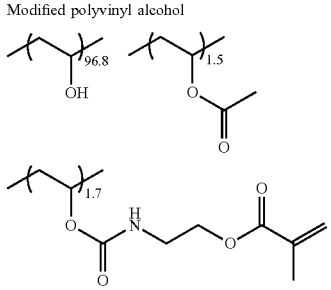

(Formation of Alignment Film)

The following coating solution for forming an alignment film was continuously applied onto a support on which an undercoat layer had been formed, using a #2 wire bar. The support on which a coating film of the coating solution for forming an alignment film had been formed was dried using a hot plate at 60° C. for 60 seconds to form an alignment film.

Coating Solution for Forming Alignment Film

| | |
|---|---|
| The following material A for photo-alignment | 1.00 part by mass |
| Water | 16.00 parts by mass |
| Butoxyethanol | 42.00 parts by mass |
| Propylene glycol monomethyl ether | 42.00 parts by mass |

- Material A for Photo-Alignment -

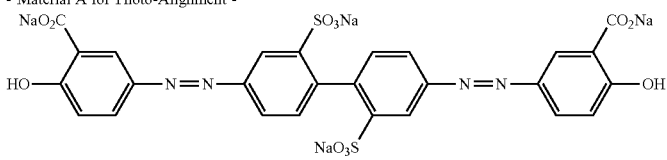

(Exposure of Alignment Film)

The alignment film was exposed using the exposure device shown in FIG. 11 to form an alignment film having an alignment pattern.

In the exposure device, a laser that emits laser light with a wavelength (405 nm) was used as a semiconductor laser. The exposure dose of the interference light was 100 mJ/cm². The single period of an alignment pattern formed by interference of two laser beams was controlled by changing an intersection angle (intersection angle α) between the two beams. As described above, the single period of the alignment pattern is a length that the optical axis derived from the liquid crystal compound rotates by 180°.

(Formation of Optically Anisotropic Layer)

The following composition was prepared as a liquid crystal composition for forming an optically anisotropic layer.

Composition

| | |
|---|---|
| Liquid crystal compound L-1 | 100.00 parts by mass |
| Polymerization initiator (Irgacure (registered trademark) 907, manufactured by BASF) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 313.00 parts by mass |

Liquid crystal compound L-1

[Chemical structures: three liquid crystal compound variants labeled 84%, 14%, and 2%, with R group defined below]

Leveling agent T-1

[Chemical structure of leveling agent T-1 with C$_6$F$_{13}$ terminal groups]

An optically anisotropic layer was formed by applying multiple layers of the composition on an alignment film. The application of the multiple layers refers to repetition of a process of preparing a liquid crystal immobilized layer by applying a composition for the first layer to an alignment film, heating and cooling the composition, and then subjecting the composition to curing with ultraviolet rays; and then applying a composition for the second or subsequent layer to the liquid crystal immobilized layer by overcoating, heating and cooling the composition in the similar manner, and then subjecting the composition to curing with ultraviolet rays. Even in a case where the total thickness of the liquid crystal layer was increased by forming the layer by the application for forming the multiple layers, the alignment direction of the alignment film was reflected from a lower surface to an upper surface of the liquid crystal layer.

First, for the first layer, the following composition was applied onto an alignment film and the coating film was heated to 70° C. on a hot plate. Next, the coating film was cooled to 25° C. and then irradiated with ultraviolet rays at a wavelength of 365 nm at an irradiation dose of 100 mJ/cm$^2$ using a high-pressure mercury lamp in a nitrogen atmosphere to immobilize the alignment of the liquid crystal compound. At this time, the film thickness of the liquid crystal layer for the first layer was 0.2 μm.

For the second or subsequent liquid crystal layer, the composition was applied onto the liquid crystal layer by overcoating, and the composition was heated, cooled, and subjected to curing with ultraviolet rays under the same conditions as described above to prepare a liquid crystal immobilized layer. Thus, overcoating was repeated until the total thickness reached a desired film thickness to form an optically anisotropic layer, and thus, a liquid crystal diffraction element was prepared.

It was confirmed with a polarizing microscope that the optically anisotropic layer finally had Δn$_{550}$ of liquid crystal×thickness (Re(550)) of 275 nm and had a periodically aligned surface as shown in FIG. 5. Further, in the liquid crystal alignment pattern of the optically anisotropic layer, the single period in which the optical axis derived from the liquid crystal compound rotated by 180° was 2.8 μm. Hereinafter, measurements of "Δn$_{550}$×d" and the like were carried out in the same manner unless otherwise specified.

<Preparation of Switching λ/2 Plate>

A polyimide film was provided as an alignment film on a glass substrate with an indium tin oxide (ITO) electrode and the alignment film was subjected to a rubbing treatment.

The two glass substrates thus obtained were allowed to face each other in an arrangement in which the rubbing directions were antiparallel, and a cell gap was set to 3.5 μm. A liquid crystal compound having a Δn of 0.099 (ZLI4792 manufactured by Merck & Co., Inc.) was injected into the cell gap to prepare a homogeneous liquid crystal cell.

In addition, a birefringent film having an in-plane retardation (Re(550)) of 35 nm was attached thereto such that the alignment direction of the prepared homogeneous liquid crystal cell and the slow axis were orthogonal to each other, thereby preparing a switching λ/2 plate.

It was confirmed that in a case where a voltage of 1.9 V is applied between the ITO electrodes of the prepared switching λ/2 plate, the Re(550) of the switching λ/2 plate is zero, and in a case where a voltage of 9.1 V is applied, the Re(550) of the switching λ/2 plate is 275 nm and the phase difference could be switched between zero and λ/2.

<Preparation of Reflection Type Liquid Crystal Diffraction Element>

The support and the alignment film were formed and exposed in the same manner as for the liquid crystal diffraction element prepared above. It should be noted that the intersection angle of exposure was set such that single period of the liquid crystal alignment pattern was 0.42 μm.

Then, among the methods for manufacturing a liquid crystal diffraction element, only the liquid crystal composition was changed to the following composition to form an optically anisotropic layer. As a result, a reflection type liquid crystal diffraction element was prepared.
Composition

| | |
|---|---|
| Liquid crystal compound L-1 | 100.00 parts by mass |
| Chiral agent B | 9.13 parts by mass |
| Polymerization initiator (Irgacure (registered trademark) 907, manufactured by BASF) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2,840.00 parts by mass |

Chiral agent B

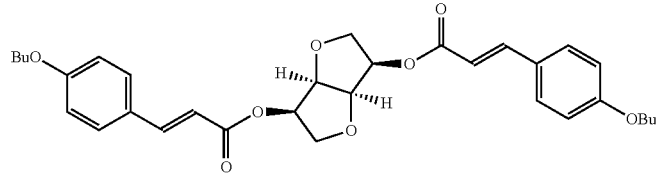

The single period in which the optical axis derived from a liquid crystal compound of the reflection type liquid crystal diffraction element rotated by 180° was 0.42 μm.

<Preparation of Optical Element and Image Display Device>

A light guide plate (refractive index: 1.52) made of glass as shown in FIG. 1 was prepared. One end face of the light guide plate in the longitudinal direction was processed into a tilted surface (incidence surface) as shown in FIG. 1 in order to allow light to be incident into the light guide plate obliquely. The tilted surface was tilted by 60° with respect to the longitudinal direction of the light guide plate.

The prepared liquid crystal diffraction element was bonded to the tilted surface of the light guide plate, and the switching λ/2 plate was bonded to the liquid crystal diffraction element to prepare an optical element. The bonding was performed using an adhesive (SK Dyne 2057, manufactured by Soken Chemical & Engineering Co., Ltd.).

The liquid crystal diffraction element was bonded to the light guide plate such that the one direction along which the optical axis of the liquid crystal compound rotates in the optically anisotropic layer coincided with the longitudinal direction of the light guide plate.

As shown in FIG. 1, the prepared reflection type liquid crystal diffraction element was bonded to the main surface of the end part of the light guide plate opposite to the liquid crystal diffraction element or the like.

A display that emits a right-handed circular polarization image was prepared. This display is a projection type liquid crystal display element in which a reflection type liquid crystal display element is combined with a projection light source and a convex lens. The linearly polarized light emitted from the reflection type liquid crystal display element is converted into right-handed circularly polarized light by the λ/4 plate.

An image display device was prepared by arranging this display so as to irradiate an image toward the main surface of the switching λ/2 plate.

Comparative Example 1

An image display device was prepared in the same manner as in Example 1, except that the optical element did not have a switching λ/2 plate.

[Evaluation]

An image was displayed using the prepared image display device, and the field of view was measured. Further, a green image was used for evaluation.

In Example 1, switching between a phase difference zero and a phase difference λ/2 (275 nm) in the switching λ/2 plate was performed by changing an applied voltage.

In addition, in Example 1, the display image was divided into halves in the horizontal direction, and the display image was displayed in a time-division manner into the right-side image and the left-side image, matching the timing to the switching between the phase difference zero and the phase difference λ/2 on the switching λ/2 plate.

As a result, it was confirmed that the field of view of Comparative Example 1 was 15°, whereas the field of view of Example 1 was 30°, and thus, the field of view could be expanded.

From the results, the effect of the present invention is apparent.

It can be suitably used for applications such as AR glasses.

EXPLANATION OF REFERENCES

10, 40: image display device
12: display
14: optical element
16: diffraction element
20: light guide plate
24, 42: liquid crystal diffraction element
26: switching λ/2 plate
30: support
32: alignment film
34: optically anisotropic layer
36: liquid crystal compound
36A: optical axis
60: exposure device
62: laser
64: light source
68: beam splitter
70A, 70B: mirror
72A, 72B: λ/4 plate
$L_1, L_2$: incidence light
$L_4, L_5$: incidence light
M: laser light
MA, MB: beam
$P_O$: linearly polarized light
$P_R$: right-handed circularly polarized light
$P_L$: left-handed circularly polarized light
Q1, Q2: absolute phase

What is claimed is:

1. An optical element comprising:
a light guide plate;
a switching $\lambda/2$ plate capable of switching a phase difference between zero and $\lambda/2$; and
a first optically anisotropic layer that is arranged between the light guide plate and the switching $\lambda/2$ plate, is formed using a composition including a liquid crystal compound, and has a liquid crystal alignment pattern in which an orientation of an optical axis derived from the liquid crystal compound changes while continuously rotating along at least one in-plane direction of the first optically anisotropic layer.

2. The optical element according to claim 1,
wherein in the liquid crystal alignment pattern of the first optically anisotropic layer, the orientation of the optical axis derived from the liquid crystal compound changes while continuously rotating along only one in-plane direction of the first optically anisotropic layer.

3. The optical element according to claim 1, further comprising a second optically anisotropic layer that is formed using a composition including a liquid crystal compound and has a liquid crystal alignment pattern in which an orientation of an optical axis derived from the liquid crystal compound changes while continuously rotating along at least one in-plane direction of the second optically anisotropic layer,
wherein the switching $\lambda/2$ plate is arranged between the first optically anisotropic layer and the second optically anisotropic layer.

4. The optical element according to claim 3,
wherein in the liquid crystal alignment pattern of the first optically anisotropic layer and the liquid crystal alignment pattern of the second optically anisotropic layer, the orientation of the optical axis derived from the liquid crystal compound changes while continuously rotating along only one in-plane direction of the optically anisotropic layer, and
in the liquid crystal alignment pattern of the first optically anisotropic layer and the liquid crystal alignment pattern of the second optically anisotropic layer, the one in-plane directions are the same.

5. The optical element according to claim 1,
wherein the optical element has a plurality of sets of combinations of the switching $\lambda/2$ plate and the first optically anisotropic layer.

6. An image display device comprising:
the optical element according to claim 1; and
a display that irradiates the optical element with an image.

7. The image display device according to claim 6,
wherein the display irradiates the optical element with the image at an angle with respect to a normal line of a main surface of the light guide plate.

8. An image display device comprising:
the optical element according to claim 3; and
a display that irradiates the optical element with an image.

9. The image display device according to claim 8,
wherein the display irradiates the optical element with the image in a normal direction of a main surface of the light guide plate.

10. The image display device according to claim 6,
wherein the display irradiates a circular polarization image.

11. The image display device according to claim 8,
wherein the display irradiates a circular polarization image.

12. The image display device according to claim 6,
wherein the display divides the image into a plurality of images and displays the divided images in a time-division manner.

13. The image display device according to claim 12,
wherein the time-division display of the image by the display and the switching of a phase difference by the switching $\lambda/2$ plate are synchronized.

14. The image display device according to claim 8,
wherein the display divides the image into a plurality of images and displays the divided images in a time-division manner.

15. The image display device according to claim 14,
wherein the time-division display of the image by the display and the switching of a phase difference by the switching $\lambda/2$ plate are synchronized.

* * * * *